United States Patent
Agarwal et al.

(10) Patent No.: US 10,659,924 B2
(45) Date of Patent: *May 19, 2020

(54) SYSTEM AND METHOD FOR DISPLAYING MOBILITY TRAILS FOR MOBILE CLIENTS

(71) Applicant: Hewlett Packard Enterprise Development LP, Houston, TX (US)

(72) Inventors: Gopal Agarwal, Bangalore (IN); Venkatesh Joshi, Bangalore (IN); Anupam Wadhawan, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/351,025

(22) Filed: Mar. 12, 2019

(65) Prior Publication Data

US 2019/0215661 A1 Jul. 11, 2019

Related U.S. Application Data

(63) Continuation of application No. 15/649,966, filed on Jul. 14, 2017, now Pat. No. 10,237,700, which is a continuation of application No. 14/610,682, filed on Jan. 30, 2015, now Pat. No. 9,712,975.

(60) Provisional application No. 62/018,610, filed on Jun. 29, 2014.

(51) Int. Cl.
*H04W 4/029* (2018.01)
*H04W 24/10* (2009.01)
*H04W 24/04* (2009.01)

(52) U.S. Cl.
CPC .......... *H04W 4/029* (2018.02); *H04W 24/10* (2013.01); *H04W 24/04* (2013.01)

(58) Field of Classification Search
CPC ....... H04W 4/02; H04W 4/028; H04W 4/029; H04W 4/04; H04W 28/26; H04W 52/262; H04W 64/006; H04W 72/085; H04W 84/12
USPC ...................................................... 455/457
See application file for complete search history.

(56) References Cited

U.S. PATENT DOCUMENTS

| | | | |
|---|---|---|---|
| 6,317,599 B1 | 11/2001 | Rappaport | |
| 2007/0207807 A1 | 9/2007 | Duda | |
| 2007/0214412 A1* | 9/2007 | Arquie | H04L 41/12 715/210 |
| 2013/0109414 A1 | 5/2013 | Miyazaki | |
| 2013/0122935 A1 | 5/2013 | Das et al. | |
| 2013/0226451 A1 | 8/2013 | O'Neill et al. | |
| 2013/0257657 A1 | 10/2013 | Garin et al. | |

(Continued)

*Primary Examiner* — Timothy X Pham
(74) *Attorney, Agent, or Firm* — Hewlett Packard Enterprise Patent Department

(57) ABSTRACT

The present disclosure discloses a system and a method for displaying mobile trails for mobile client devices. Specifically, a network device obtains a plurality of performance measurements and a corresponding plurality of physical locations for a client device over a period of time. Then the network device generates a plurality of visual representations for the client device over the period of time, each visual representation representing a respective performance measurement and a respective physical location at a respective time during the period of time. Moreover, the network device can display, store, and/or transmit a map of a physical environment with the plurality of visual representations.

20 Claims, 10 Drawing Sheets

(56) References Cited

U.S. PATENT DOCUMENTS

| | | |
|---|---|---|
| 2014/0067257 A1 | 3/2014 | Dave et al. |
| 2014/0080514 A1* | 3/2014 | Das .................. G01S 5/0252 455/456.1 |
| 2014/0155099 A1* | 6/2014 | Cho .................. H04W 4/02 455/456.3 |
| 2014/0274109 A1 | 9/2014 | Venkatraman |
| 2014/0378166 A1 | 12/2014 | Hong et al. |
| 2015/0172908 A1* | 6/2015 | Hadinata ............ G01C 21/3461 455/421 |
| 2015/0358834 A1* | 12/2015 | Cronin .................. H04W 24/02 455/452.1 |
| 2015/0373567 A1 | 12/2015 | Kish et al. |
| 2016/0345134 A1* | 11/2016 | Tsuda ................... H04W 4/029 |

* cited by examiner

| RF PROPERTIES 300 | RF PROPERTY VALUES 310 |
|---|---|
| CLIENT NAME 320 | SIRIUS BLACK |
| CLIENT MAC ADDRESS 330 | C8:F7:33:26:64:4D |
| DEVICE TYPE 340 | WINDOWS |
| AP ASSOCIATION 350 | 105-4 |
| FREQUENCY/PHY 360 | 11na |
| CLIENT HEALTH 370 | 89% |
| USAGE 380 | 0 bps |
| SIGNAL STRENGTH 390 | -42dBm |
| CLIENT LOCATION STATIC? 395 | NO |
| ... ... | ... ... |

FIG. 3

| CALL QUALITY PARAMETERS 400 | CALL QUALITY PARAM VALUES 410 |
|---|---|
| CLIENT HEALTH 420 | 89% |
| CALL PROTOCOL 430 | JABBER |
| CALL TYPE 440 | VOICE |
| START TIME 450 | 1/1/2015 0:00:00 |
| QUALITY 460 | GOOD |
| ... ... | ... ... |

FIG. 4

SYSTEM AND METHOD FOR DISPLAYING MOBILITY TRAILS FOR MOBILE CLIENTS

RELATED APPLICATION

This application is a Continuation of U.S. application Ser. No. 14/610,682 filed on Jan. 30, 2015 and claims priority to U.S. provisional patent application No. 62/018,610, entitled "A System and Method for Displaying Mobile Trail for Mobile Clients," filed on Jun. 29, 2014, the entirety of which is incorporated herein by reference.

FIELD

The present disclosure relates to network interface in local area networks. In particular, the present disclosure relates to a method and/or network system for displaying mobile trail for mobile devices.

BACKGROUND

In a wireless local area network (WLAN), it is helpful to enable a network administrator to troubleshoot bad call quality issues reported by mobile users (e.g., Lync® and/or Jabber® users) due to the radio frequency (RF) environment. However, because the users are mobile, they might not be in the same geographic location for the entire duration of a voice and/or video call. Thus, when a mobile user reports a poor call quality issue, it remains challenging for the network administrator to figure out the RF environment which led to the bad call quality.

DETAILED DESCRIPTION

In the following description, several specific details are presented to provide a thorough understanding. While the context of the disclosure is directed to network visual representations, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 3 shows a block diagram illustrating exemplary radio frequency (RF) information displayed to a network administrator according to embodiments of the present disclosure.

FIG. 4 shows a block diagram illustrating exemplary call quality information displayed to a network administrator according to embodiments of the present disclosure.

OVERVIEW

Embodiments of the present disclosure relate to network visual representation in a wireless local area network. In particular, embodiments of the present disclosure describe a method and system for conveying information using broadcast frames.

In general, as part of equipping the network administrator with suitable tools to debug the issues leading to bad call quality, embodiments of the present disclosure provide a visual representation of the roaming chart of a mobile client (e.g., a Lync® and/or Jabber® client) on a floor plan as the mobile client moves around the physical area corresponding to the floor plan while making voice/video calls. This makes it easier for the network administrator to deduce the radio frequency (RF) environment of the user for the duration of the call. The basic premise of the present disclosure is to maintain a database of the mobile client's roaming chart (e.g., a geographic location) within the wireless network for the entire duration of its presence in the network.

Network Environment

Figure 1:
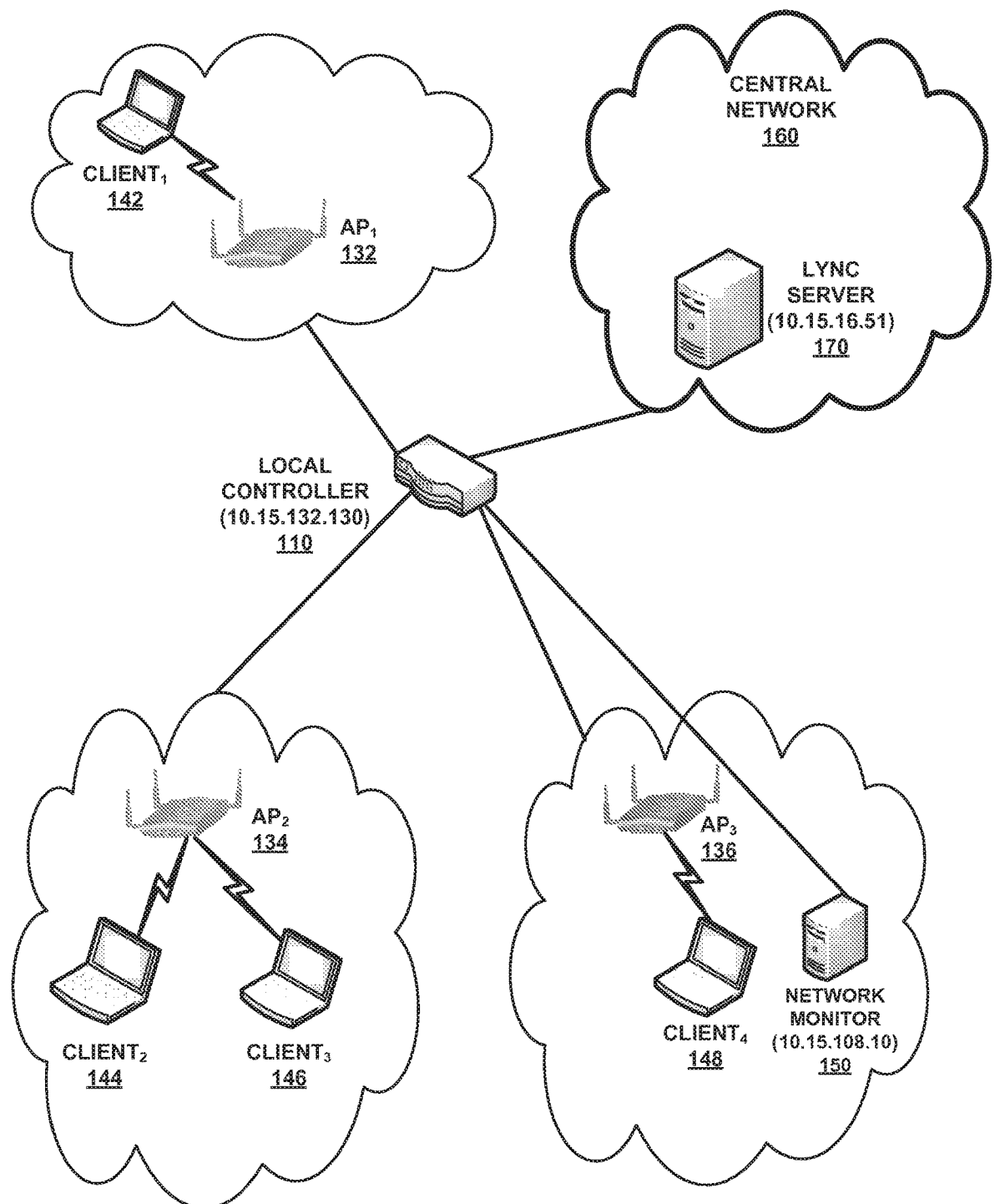
FIG. 1 shows an exemplary network environment according to embodiments of the present disclosure.

FIG. 1 shows an exemplary network environment according to embodiments of the present disclosure. Network as illustrated in FIG. 1 includes at least a local controller 110, a plurality of access points serving a plurality of mobile client devices, a network monitor 150, etc. Specifically, the plurality of access points includes $AP_1$ 132, $AP_2$ 134, $AP_3$ 136, etc. In this example, $Client_1$ 142 is associated with $AP_1$ 132; $Client_2$ 144 and Clients 146 are associated with $AP_2$ 134; and, $Client_4$ 148 is associated with $AP_3$ 136.

Note that, client devices may be capable of placing voice calls, video calls, uniform communication calls, etc., on the wireless network. Different client devices may use different UCC applications. For example, $Client_1$ 142 and $Client_4$ 148 may be Jabber® users; whereas $Client_2$ 144 and $Client_3$ 146 may be Lync® users. Also, client devices can roam from one access point to another access point, e.g., when they change their physical locations. They will receive seamless network services when they physically move around within the network coverage area. This is so even when a client device is on an active voice, video, and/or UC call while it moves around an office building. The network infrastructure can track the locations of each client devices and report them to a local engine (not shown) located in central network 160.

Moreover, local controller 110 is connected to central network 160 through a secure tunnel. Central network 160, which may be located at a company's headquarter, has a plurality of servers, including but not limited to, Lync server 170 for serving client devices on uniform communication calls.

For illustration purposes only, assuming that local controller 110 has an Internet Protocol (IP) address of 10.15.132.130; network monitor 150 has an IP address of 10.15.108.10; and Lync Server 170 has an IP address 10.15.16.51.

Basic Visual Representation of Mobile Clients

Figure 2:
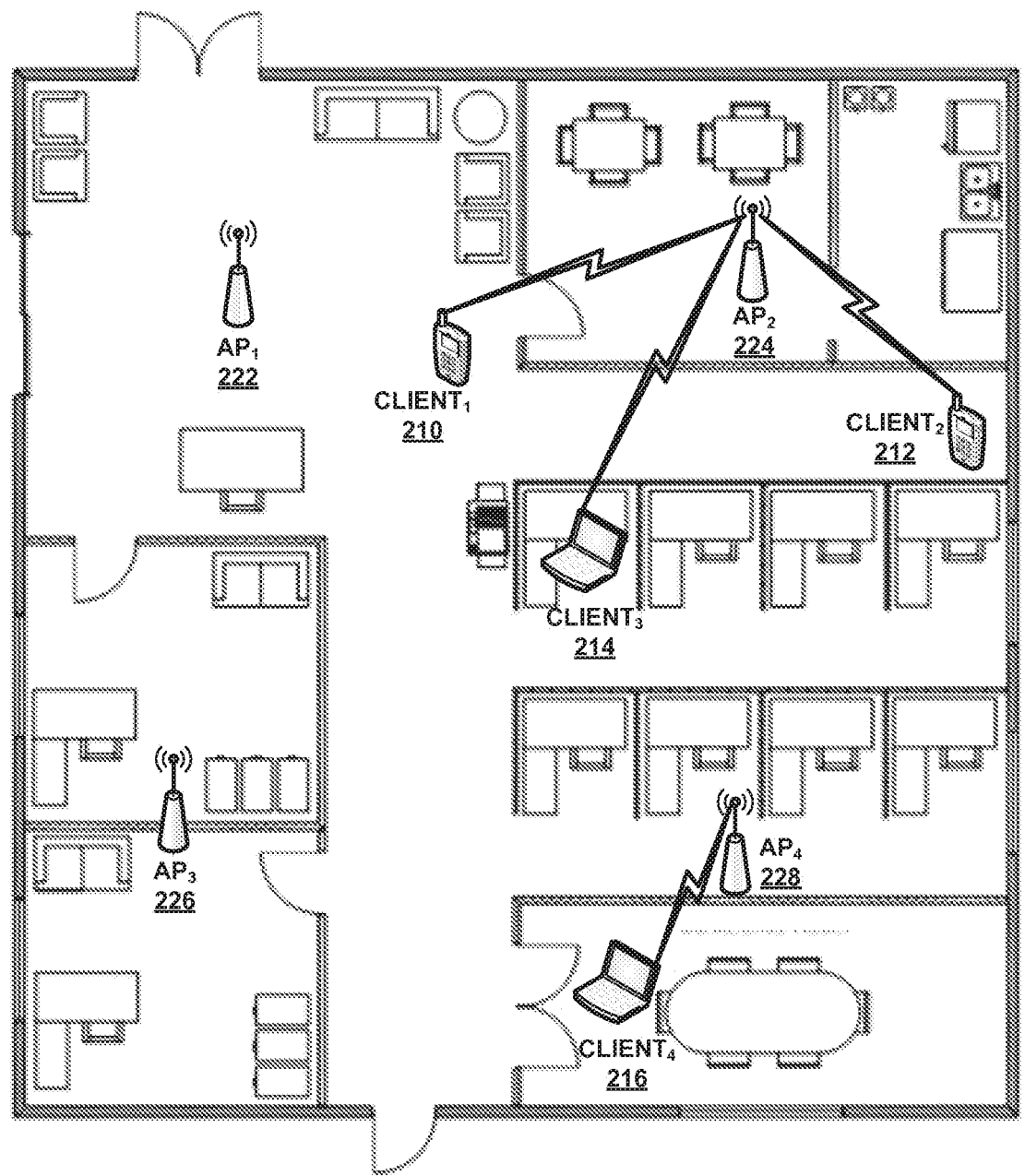
FIG. 2 shows an exemplary visual representation of mobility traits for mobile client devices in a wireless network according to embodiments of the present disclosure.

FIG. 2 shows an exemplary visual representation of mobility trails for mobile client devices in a wireless network according to embodiments of the present disclosure. The disclosed system is capable of displaying real-time mobile client locations on a floor map. A network administrator can import a floorplan and geographic coordinates of mobile clients into the disclosed system. Given the floorplan and the geographic coordinates of a mobile client, it is possible to display the location of the mobile client on the floorplan as illustrated in FIG. 2, which shows a useful intuitive visual representation of the mobile clients in a wireless network.

For the purposes of ascertaining the geographic coordinates of a mobile client, it is possible to rely on the triangulation of the signals received from the mobile client at a minimum of three access points. This provides reasonably accurate location information of the mobile client device (or user), e.g., to be accurately located within 10 meters of calculated location. Given a floorplan, it would be easy to position the mobile client on the floorplan based on the location coordinates. Therefore, it can be intuitive for the network administrator to understand where exactly the user was at any given point of time.

Specifically, FIG. 2 shows that four APs, namely, $AP_1$ 222, $AP_2$ 224, $AP_3$ 226, and $AP_4$ 228 are located in the area depicted on the floorplan. Moreover, four mobile client devices, such as, $Client_1$ 210, $Client_2$ 212, $Client_3$ 214, and $Client_4$ 216 are also located in the same area. In particular, the visual representation as shown in FIG. 2 can display the real-time location of each mobile client device on the floorplan.

Moreover, the visual representation can also show associations between different mobile client devices and different APs. For example, in FIG. 2, Clients 210 is shown to be located in a lobby and associated with $AP_2$ 224; $Client_2$ 212 is shown to be located in hallway and associated with $AP_2$ 224; $Client_3$ 214 is shown to be located in a cubicle and associated with $AP_2$ 224; and, $Client_4$ 216 is shown to be located in a conference room and associated with $AP_4$ 228.

Moreover, the geographic location of a mobile client can be combined with the radio frequency (RF) properties of the mobile client to provide a powerful assessment of the RF environment of the particular mobile client at a given location. Some examples of the RF properties of the user include, but are not limited to, the followings: client health; transmission power; Received Signal Strength Indicator (RSSI); Noise Floor; etc.

FIG. 3 shows a block diagram illustrating exemplary radio frequency (RF) information displayed to a network administrator according to embodiments of the present disclosure. FIG. 3 includes examples of RF properties 300 and RF property values 310 for a particular mobile client device. RF properties 300 include at least client name 320, client Media Access Control (MAC) address 330, device type 340, AP association 350, frequency/PHY 360, client health 370, usage 380, signal strength 390, an indication whether client location is static 395, etc.

For example, the illustrated mobile client device has a client name 320 value of "Sirius Black" and MAC address 330 "C8:F7:33:26:64:4D." Its device type is Windows. This particular mobile client device is currently associated with an AP named "105-4" and supports 11 na PHY protocol. Its client health score is 89% healthy. At the moment, the particular mobile client device is not using any wireless network bandwidth. Moreover, the signal strength associated with a signal last received from this mobile client device is −42 dBm. This client device has no static location and is a mobile client capable of roaming in the network.

These RF properties would give the network administrator powerful means for not only determining the geographical location of a mobile client device, but also determining the RF environment of the mobile client device.

In addition, two more enhancements can be made to create an even more powerful debugging tool for call quality issues. First, a mobility trail (or a roaming chart) of a mobile client device can be displayed while the mobile client device is making and receiving calls in the network. Second, call quality information for the calls made by the user can be displayed. Superimposing the call quality information over the mobility trail of the user provides an invaluable troubleshooting aid for the network administrator.

Furthermore, the call quality information can be overlaid over the roaming trail of mobile clients on the visual representation. Specifically, the following call quality parameters are overlaid on the roaming chart: start time; end time; type of the call (voice/video etc); and call quality (good/fair/poor). This provides a very useful and powerful tool for the network administrator. It enables her to do the following (a) troubleshoot quality issues due to the RF environment for a user; and (b) determine the presence of coverage holes within the wireless network and taking appropriate action.

FIG. 4 shows a block diagram illustrating exemplary call quality information displayed to a network administrator according to embodiments of the present disclosure. Specifically, FIG. 4 includes call quality parameters 400 and call quality parameter values 410 for a particular mobile client device. Call quality parameters 400 include at least client health 420, call protocol 430, call type 440, start time 450, quality 460, etc.

According to call quality information displayed as in FIG. 4, a network administrator can learn that the selected client device has a client health score of 89%. It is currently on a voice call via Jabber. This voice call started at Jan. 13, 2015 at 0:00:00. The voice call currently has a good quality.

In some embodiments, the RF property information and the call quality information can be displayed side by side within the same user interface in a panel and/or tab next to the mobility trail of the mobile client device to provide better visibility. When a network administrator selects a different mobile client device, the RF property information and/or the call quality information will be automatically updated to reflect the selected mobile client device.

Color-Coded or Stylized Mobility Trails

Figure 5:
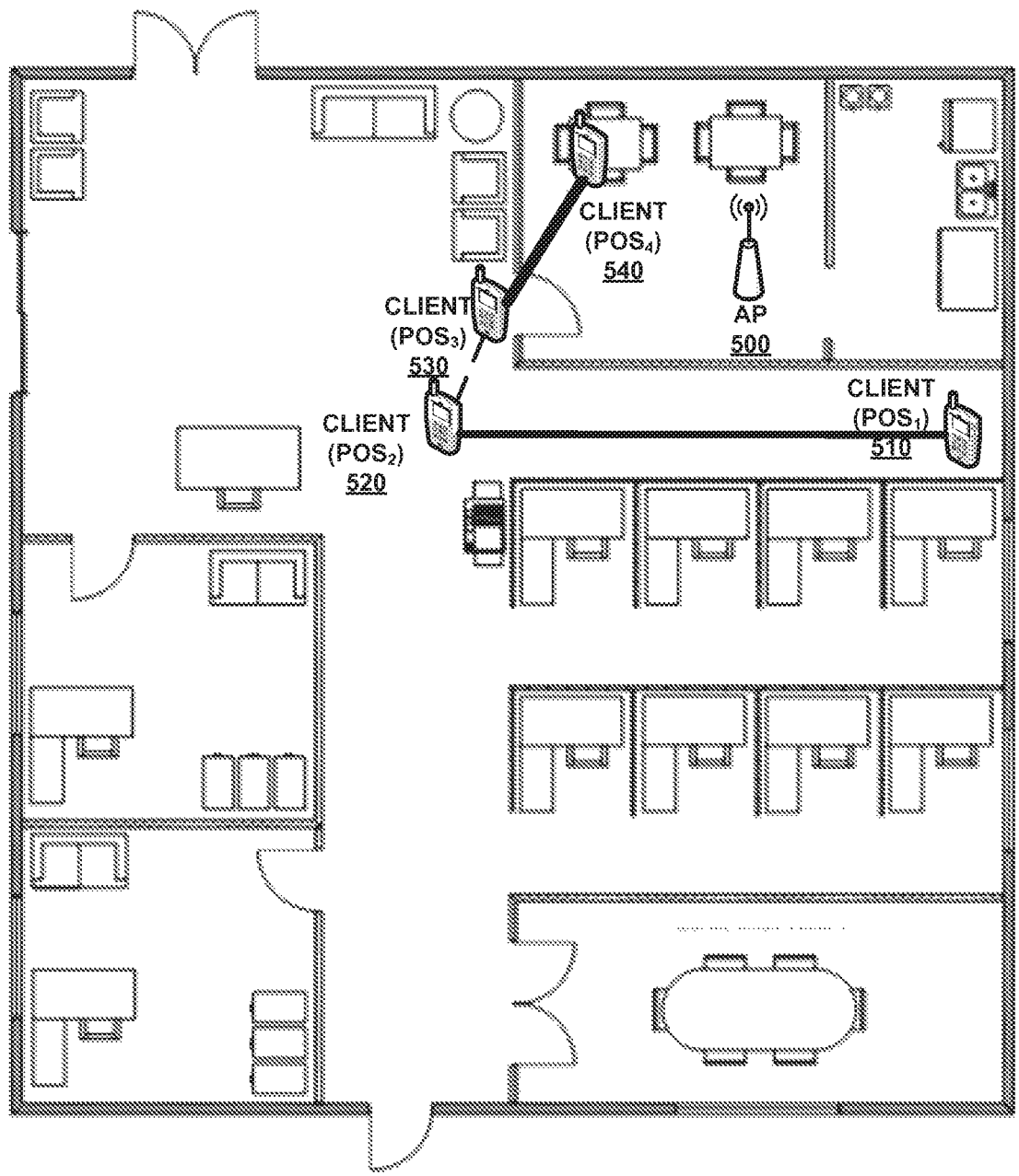
FIG. 5 shows an exemplary visual representation of mobility trails for mobile client devices in a wireless network according to embodiments of the present disclosure.

FIG. 5 shows an exemplary visual representation of mobility trails for mobile client devices in a wireless network according to embodiments of the present disclosure. In this example, a mobile client device is associated with AP 500. The mobile client device moves from a first position $POS_1$ 510 in a hallway to a second position $POS_2$ 520 in a lobby, then a third position $POS_3$ 530 next to a dining room, and eventually to its final position $POS_4$ 540.

As the mobile client device moves along the mobility trail illustrated in FIG. 5, the mobility client device also is on an active voice call. The mobility client device may notice that the call quality varies as it moves from one position to another position. According to embodiments of the present disclosure, not only the mobility trail along which the mobile client device moves will be displayed in the visual presentation, but also the call quality can be visually displayed as well.

For illustration purposes only, assuming that when the mobile client device has a good call quality when moving from $POS_1$ 510 to $POS_2$ 520, then it suffered from a period of poor call quality when moving from $POS_2$ 520 to $POS_3$ 530, but the call quality is recovered and becomes good again when it moves from $POS_3$ 530 to $POS_4$ 540.

In some embodiments, a level of call quality may be represented by the thickness of the line corresponding to the mobility trail. Therefore, as illustrated in FIG. 5, the mobility trail of the client device between $POS_1$ 510 and $POS_2$ 520 and between $POS_3$ 530 and $POS_4$ 540 corresponds to a thick line representing a good call quality. By contrast, the mobility trail of the client device between $POS_2$ 520 and $POS_3$ 530 corresponds to a thin line representing a poor call quality.

In some embodiments, a level of call quality may be represented by the color of the line corresponding to the mobility trail. Therefore, the mobility trail of the client device between $POS_1$ 510 and $POS_2$ 520 and between $POS_3$ 530 and $POS_4$ 540 may correspond to a green line representing a good call quality. By contrast, the mobility trail of the client device between $POS_2$ 520 and $POS_3$ 530 corresponds to a yellow line representing a poor call quality.

In other embodiments, a level of call quality may be represented by the shade of the line corresponding to the mobility trail. Therefore, as illustrated in FIG. 5, the mobility trail of the client device between $POS_1$ 510 and $POS_2$ 520 and between $POS_3$ 530 and $POS_4$ 540 corresponds to a dark line representing a good call quality. By contrast, the mobility trail of the client device between $POS_2$ 520 and $POS_3$ 530 corresponds to a light line representing a poor call quality.

Mobility Trails with Location History Replay

In some embodiments, the visual presentation may include a replay option. When the reply option is selected, a network administrator can view a replay of the mobile client device's mobility trail. Note that, the replay is not an extrapolated display based on the duration of the call and the stored mobility trail of the mobile client device. Instead, the replay includes accurate details of the mobile client device's moving speed at each location. Thus, if the client device paused at $POS_2$ for a period of time before moving to $POS_3$, the replay will show the icon of the mobile client device as pausing for the same period of time as well.

The ability of accurately replay the location history of a particular mobile client device on a mobility trail allows a network administrator to identify where on the floorplan a particular client device encounter bad call quality. The network administrator can then try to find out additional information, such as RSSI, delay, jitter, packet loss, etc., to determine whether the poor call quality is caused by poor connection by the particular client device or due to issues on the other caller's end.

Mobility Trails for Selected Call Type

Figure 6A:
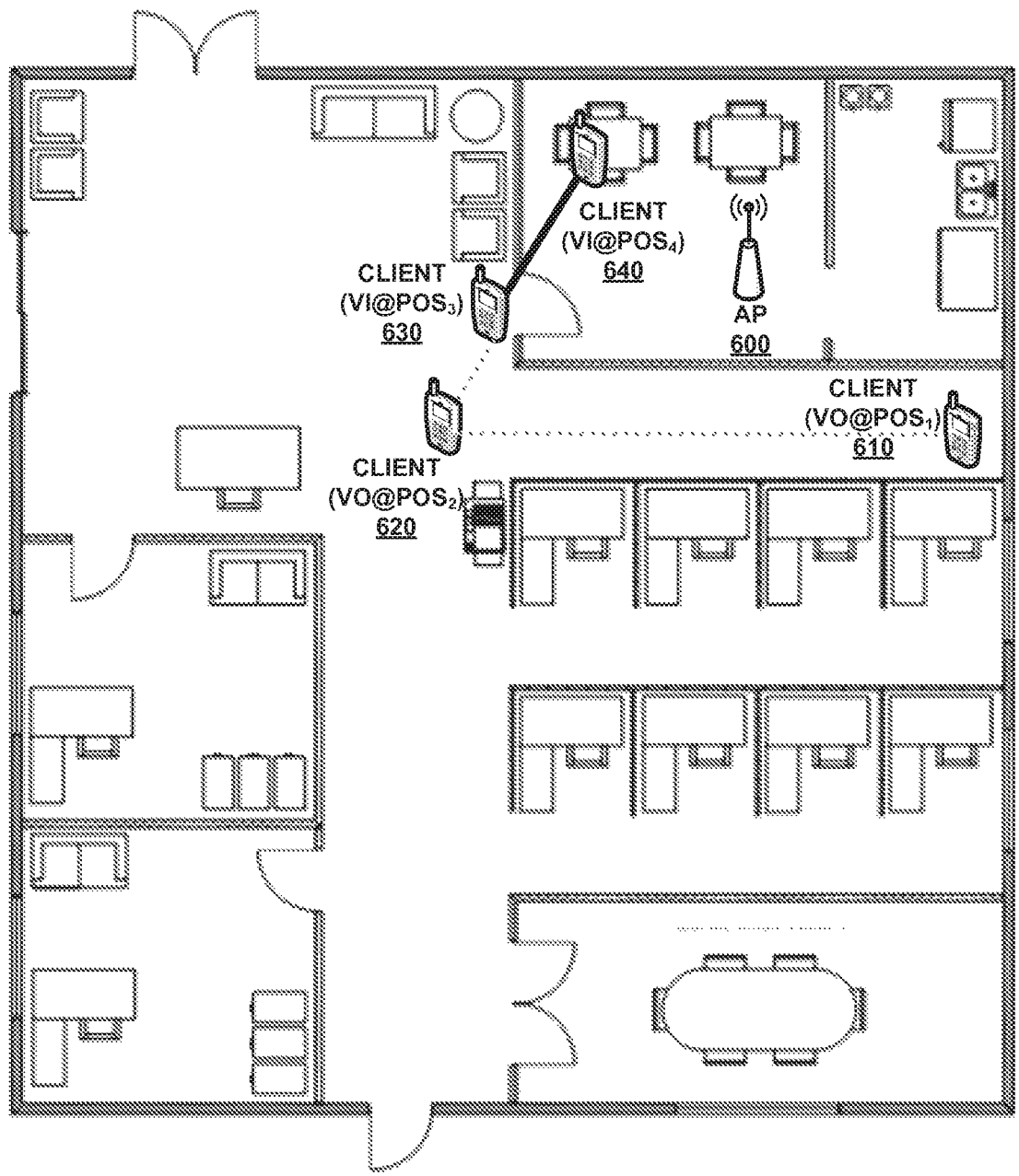
FIG. 6A-6B show exemplary visual representations of mobility trails for mobile client devices in a wireless network according to embodiments of the present disclosure.
Figure 6B:
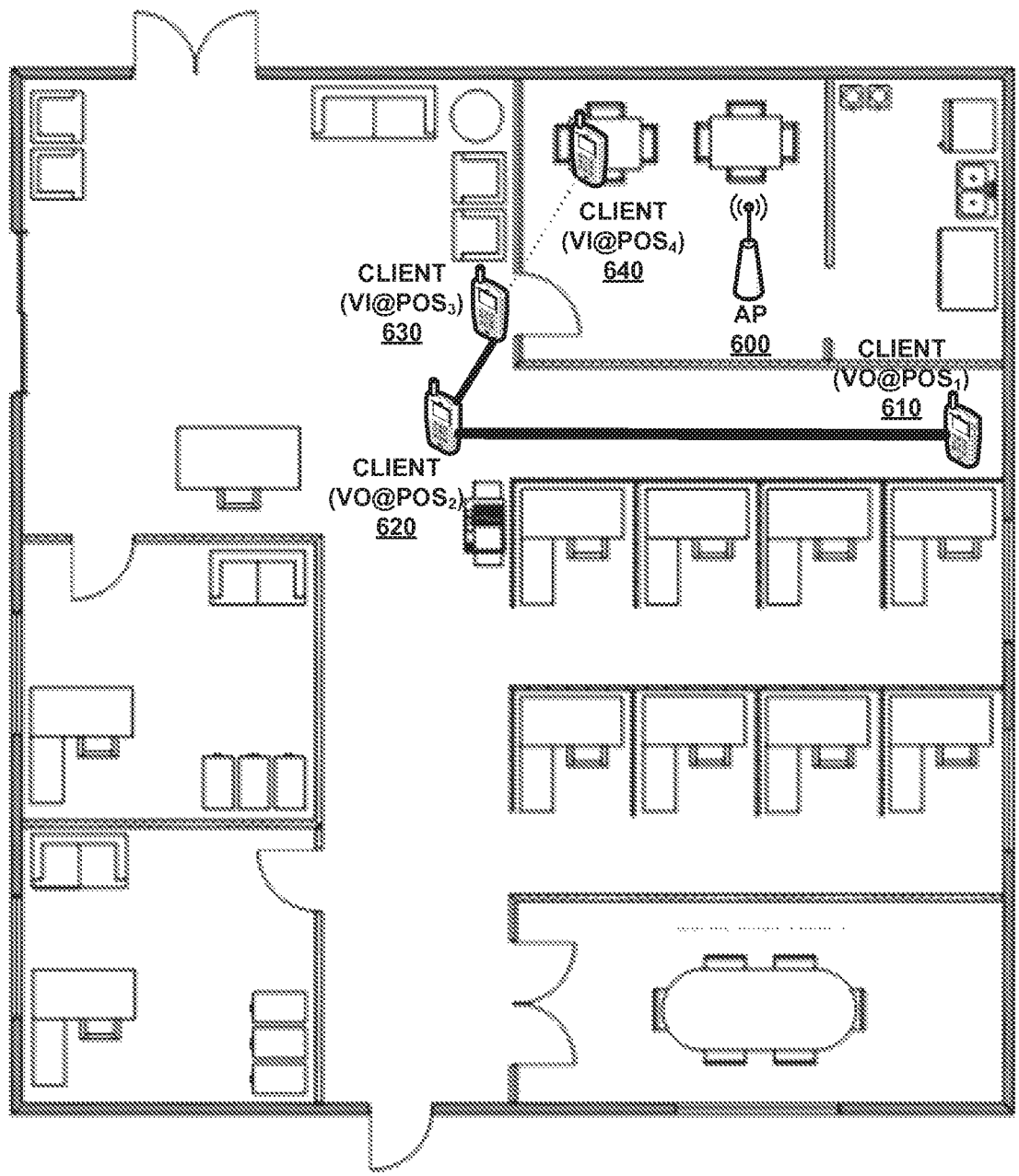

FIGS. 6A-6B show exemplary visual representations of mobility trails for mobile client devices in a wireless network according to embodiments of the present disclosure. Embodiments of the present disclosure support many different call types, including but not limited to, a voice call, a video call, a uniform communication call, etc. As illustrated in FIGS. 6A-6B, a mobile client device is associated with AP 600. The mobile client device may start a call as a voice call at POS1 610 and then move to $POS_2$ 620 and $POS_3$ 630, etc. At $POS_3$ 630, however, the mobile client device may need to add a video stream to the call. Therefore, the mobile client device is on a video call instead of a voice-only call when it moves from $POS_3$ 630 to $POS_4$ 640.

According to embodiments of the present disclosure, a network administrator can select a particular call type, e.g., a voice call or a video call. If a video call is selected, because the client device is in a video call when it moves from $POS_3$ 630 to $POS_4$ 640, the mobility trail corresponding to the segment $POS_3$ 630 to $POS_4$ 640 will display the video call quality as represented by the style, thickness, color, and/or shade of the segment line. Based on pre-configured preferences, the segments of mobility trail corresponding non-selected call types (e.g., from $POS_1$ 610 to $POS_2$ 620 to $POS_3$ 630) may be either omitted from the visual presentation or grayed out in the visual presentation as illustrated in FIG. 6A.

If a voice call is selected, because the client device is in a voice call when it moves from $POS_1$ 610 to $POS_2$ 620 to $POS_3$ 630, the mobility trail corresponding to the segment $POS_1$ 610 to $POS_2$ 620 and the segment from $POS_2$ 620 to $POS_3$ 630 will display the video call quality as represented by the style, thickness, color, and/or shade of the segment line. Based on pre-configured preferences, the segments of mobility trail corresponding non-selected call types (e.g., from $POS_3$ 630 to $POS_4$ 640) may be either omitted from the visual presentation or grayed out in the visual presentation as illustrated in FIG. 6B.

Mobility Trails with Debugging Information Display

Figure 7:
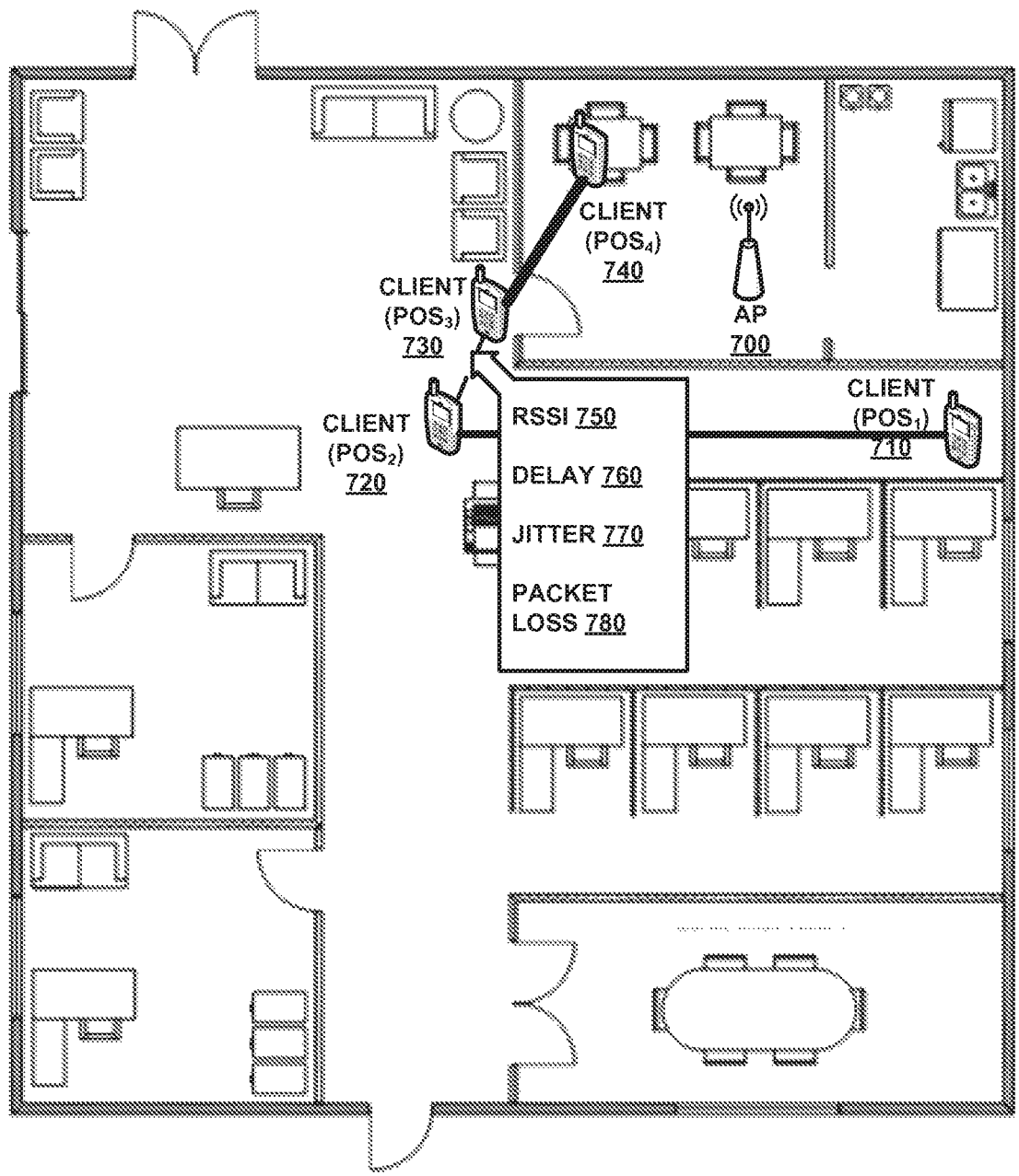
FIG. 7 shows an exemplary visual representation of mobility trails for mobile client devices in a wireless network according to embodiments of the present disclosure.

FIG. 7 shows an exemplary visual representation of mobility trails for mobile client devices in a wireless network according to embodiments of the present disclosure. Once the call quality is shown on the visual presentation, a network administrator may want to find out additional debugging information, such as RSSI, delay, jitter, packet loss, etc., to diagnose the problem. In some embodiments, such debugging information can be conveniently shown in a pop-up window when the user (or network administrator) clicks or puts the mouse over a particular location point on the mobility trail.

For example, in FIG. 7, a client device is associated with AP 700. The client device moves from $POS_1$ 710, to $POS_2$ 720, then to $POS_3$ 730, and finally to $POS_4$ 740. As shown in FIG. 7, the client device experiences good call quality during the period when it moves from $POS_1$ 710 to $POS_2$ 720 and when it later moves from $POS_3$ 730 to $POS_4$ 740. However, the client device experiences poor call quality during the period when it moves from $POS_2$ 720 to $POS_3$ 730. To diagnose why the client device experience poor call quality between $POS_2$ 720 and $POS_3$ 730, a network administrator can click to move the mouse over a location point on that particular problem segment of the mobility trail. Then visual presentation will then pop up a debugging window with information, including but not limited to, RSSI 750, delay 760, jitter 770, packet loss 780, etc. RSSI 750 represents the signal strength associated with a signal from the particular mobile client device at the location point. Likewise, delay 760 represents the delay in packet transmissions experience the particular mobile client device at the location point; jitter 770 represents the jitter experienced by the particular mobile client device at the location point; and, packet loss 780 represents the packet loss rate experienced by the particular mobile client device at the location point.

Here, jitter generally refers to the variation in latency as measured In the variability over time of the packet latency across a network. Packet jitter is typically expressed as an average of the deviation from the network mean latency. Also, packet loss generally refers to failure of a network packet to reach its destination. Packet loss rate typically is the portion (e.g., a percentage) of the network packets that fail to reach their destination.

Other Visual Representations

In addition to the aforementioned visual representations, embodiments of the present disclosure may also support one or more of the following variations of visual representations.

A. Group Mobility Trails

When a group of mobile client devices share the same moving trajectory, techniques disclosed herein can also be used to display average call quality and/or RF properties for all group members sharing a common trajectory. This variation of the visual representation can help diagnose a common network problem shared by a group of users sharing a common trajectory during the same period of time.

B. Mobile Client Information for Selected Group

A network administrator may select a particular client group. For example, all of the client devices associated with a particular access point may be selected. The visual presentation will show only the mobility trails of only the selected client devices. This visual representation is particularly useful to diagnose call quality problems when an AP is experiencing poor performance causing bad call qualities for all client devices connected to the same AP at the time. In addition, if a client device is roaming from one access point to another access point, this visual representation C. Mobility Trails for Selected Geolocation or Zone A network administrator may select a particular geolocation or geographic zone. For example, all of the client devices located within a classroom may be selected. The visual representation will show only call quality information for the selected client devices. This visual representation is particularly useful to diagnose call quality problems when client devices are experience bad call qualities at a particular geolocation or geographic zone, for example, due to local RF interference in the particular area at the time of the call.

Process for Displaying Mobility Trails for Mobile Clients

Figure 8:
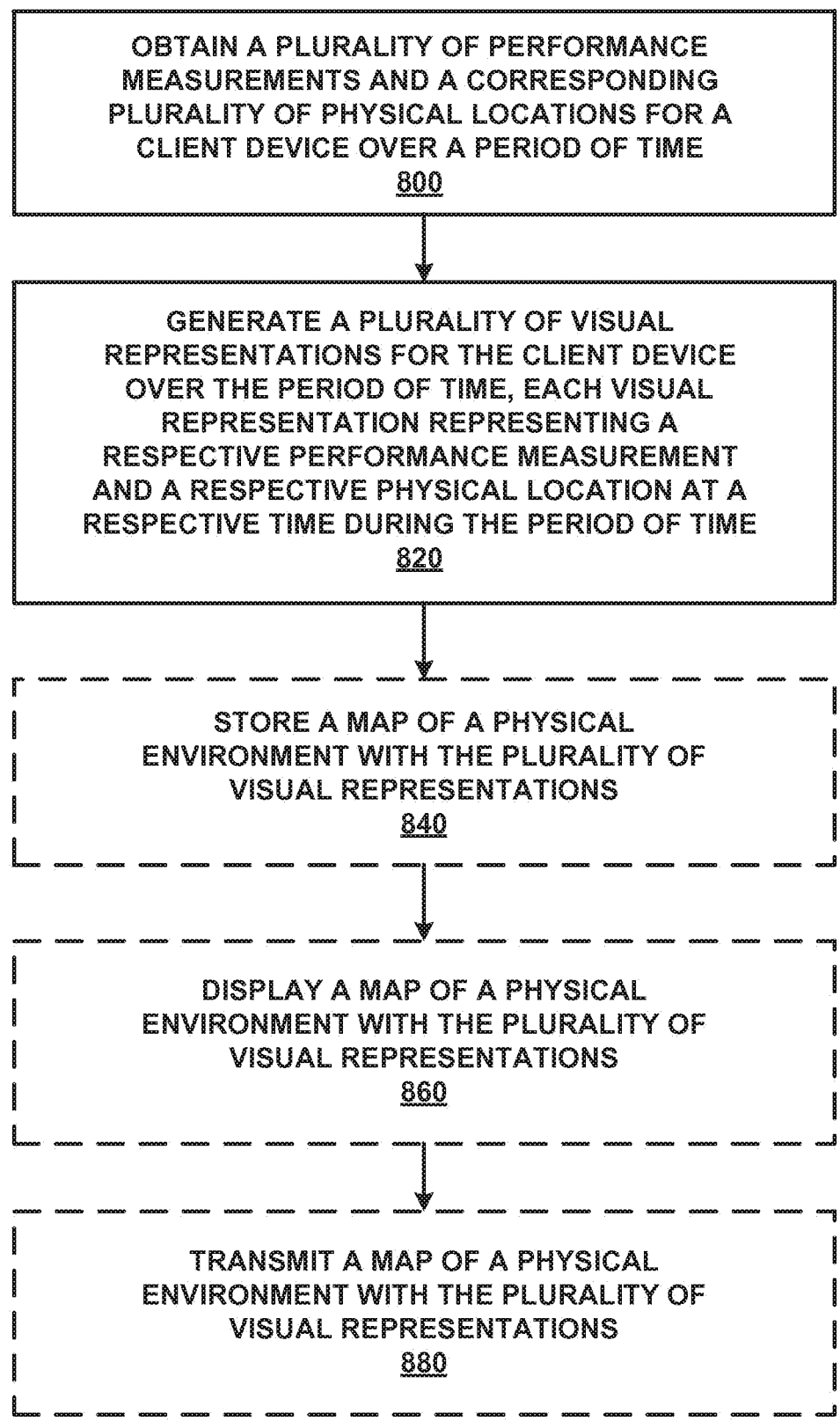
FIG. 8 illustrates an exemplary process for displaying mobility trails for mobile clients according to embodiments of the present disclosure.

FIG. 8 illustrates an exemplary process for displaying mobility trails for mobile clients according to embodiments of the present disclosure. During operations, a network device obtains a plurality of performance measurements and a corresponding plurality of physical locations for a client device over a period of time (operation 800). Then, the network device generates a plurality of visual representations for the client device over the period of time, each visual representation representing a respective performance measurement and a respective physical location at a respective time during the period of time (operation 820). In addition, the network device may store a map of a physical environment with the plurality of visual representations (operation 840), or display a map of a physical environment with the plurality of visual representations (operation 860), or a map of a physical environment with the plurality of visual representations (operation 880).

In some embodiments, the network device generates a video showing a time sequence of the client device moving through the physical environment concurrently with performance measurement at each respective time value during the period of time.

In some embodiments, the plurality of visual representations include color-coded segments, each color coded segment representing a different level of performance measurement. Specifically, a color used within each visual representation indicates the respective performance measurement for the client device.

In some embodiments, the plurality of visual representations correspond to a subset of the plurality of performance measurements during periods of time when the client device was on a particular type of call.

In some embodiments, the network device selects a plurality of client devices associated with a particular access point, and concurrently displays information for each of the plurality of client devices, the information including, for each of the plurality of client devices, the respective plurality of visual representations over the period of time.

In some embodiments, the network device selects a plurality of client devices associated with a similar trajectory, and concurrently displays information for each of the plurality of client devices, the information including, for each of the plurality of client devices, the respective plurality of visual representations over the period of time.

In some embodiments, the network device selects a plurality of client devices associated with a particular area in the physical environment, and concurrently displays information for each of the plurality of client devices, the information including, for each of the plurality of client devices, the respective plurality of visual representations over the period of time.

In some embodiments, the plurality of performance measurements indicate a level of connectivity between the client device and one or more access points with which the client device was associated during the period of time. Moreover, the plurality of performance measurements can indicate a call quality measurement for an active call for the client device.

In some embodiments, the network device identifies in the map with the plurality of visual representations, one or more points in time, when the client device switched from association with one access point to another access point. Thus, a mobile client device's roaming events can be identified in the map itself.

In some embodiments, the network device displays a particular performance characteristic, of a plurality of performance characteristics used to determine the performance measurement, in relation to locations over the period of time for the client device.

System for Displaying Mobility Trails for Mobile Clients

Figure 9:
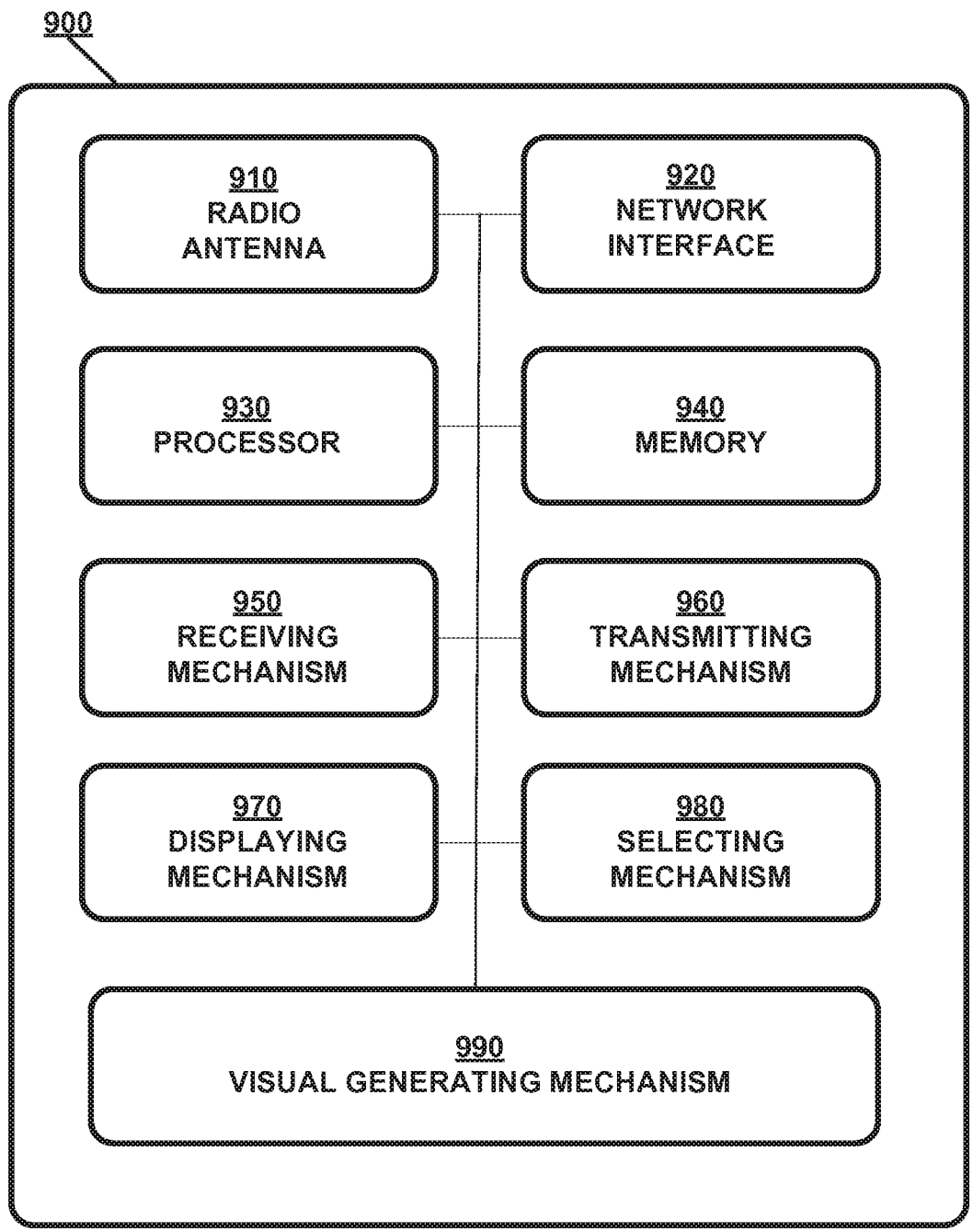
FIG. 9 is a block diagram illustrating an exemplary system for displaying mobility trails for mobile clients according to embodiments of the present disclosure.

FIG. 9 is a block diagram illustrating an exemplary system for displaying mobility trails for mobile clients according to embodiments of the present disclosure. Network device 900 includes at least one or more radio antennas 910 capable of either transmitting or receiving radio signals or both, a network interface 920 capable of communicating to a wired or wireless network, a processor 930 capable of processing computing instructions, and a memory 940 capable of storing instructions and data. Moreover, network device 900 further includes a receiving mechanism 950, a transmitting mechanism 960, a displaying mechanism 970, a selecting mechanism 680, and a visual generating mechanism 990, all of which are in communication with processor 930 and/or memory 940 in network device 900. Network device 900 may be used as a client system, or a server system, or may serve both as a client and a server in a distributed or a cloud computing environment.

Radio antenna 910 may be any combination of known or conventional electrical components for receipt of signaling, including but not limited to, transistors, capacitors, resistors, multiplexers, wiring, registers, diodes or any other electrical components known or later become known.

Network interface 920 can be any communication interface, which includes but is not limited to, a modem, token ring interface, Ethernet interface, wireless IEEE 802.11 interface, cellular wireless interface, satellite transmission interface, or any other interface for coupling network devices.

Processor 930 can include one or more microprocessors and/or network processors. Memory 940 can include storage components, such as, Dynamic Random Access Memory (DRAM), Static Random Access Memory (SRAM), etc.

Receiving mechanism 950 generally receives one or more network messages via network interface 920 or radio antenna 910 from a wireless client. The received network messages may include, but are not limited to, requests and/or responses, beacon frames, management frames, control path frames, and so on. Specifically, receiving mechanism 950 may obtain a plurality of performance measurements and a corresponding plurality of physical locations for a client device over a period of time.

Transmitting mechanism 960 generally transmits messages, which include, but are not limited to, requests and/or responses, beacon frames, management frames, control path frames, and so on. Specifically, transmitting mechanism 960 can transmit a map of a physical environment with the plurality of visual representations.

Displaying mechanism 970 generally displays visual representation of mobility trails for mobile client devices in a network. Specifically, displaying mechanism 970 can display a map of a physical environment with the plurality of visual representations.

In some embodiments, displaying mechanism 970 concurrently displays information for each of the plurality of client devices, the information including, for each of the plurality of client devices, the respective plurality of visual representations over the period of time.

In some embodiments, displaying mechanism 970 concurrently displays information for each of the plurality of client devices, the information including, for each of the plurality of client devices, the respective plurality of visual representations over the period of time.

In some embodiments, displaying mechanism 970 concurrently displays information for each of the plurality of client devices, the information including, for each of the plurality of client devices, the respective plurality of visual representations over the period of time.

In some embodiments, displaying mechanism 970 identifies in the map with the plurality of visual representations, one or more points in time, when the client device switched from association with one access point to another access point. Thus, a client device's roaming events can be identified in the map itself.

In some embodiments, displaying mechanism 970 displays a particular performance characteristic, of a plurality of performance characteristics used to determine the performance measurement, in relation to locations over the period of time for the client device.

Selecting mechanism 980 generally selects a subset of client devices in a network to be displayed with mobility trails, call quality information and/or RF property information in a visual representation. In some embodiments, selecting mechanism 980 selects a plurality of client devices associated with a particular access point. In some embodiments, selecting mechanism 980 selects a plurality of client devices associated with a similar trajectory. In some embodiments, selecting mechanism 980 selects a plurality of client devices associated with a particular area in the physical environment.

Visual generating mechanism 990 generally generates a visual representation for displaying mobility trails of client devices. Specifically, visual generating mechanism 990 can generate a plurality of visual representations for the client device over the period of time, each visual representation representing a respective performance measurement and a respective physical location at a respective time during the period of time. Moreover, in some embodiments, visual generating mechanism 990 can generate a video showing a time sequence of the client device moving through the physical environment concurrently with performance measurement at each respective time value during the period of time.

Here, the plurality of visual representations may include color-coded segments, where each color-coded segment represents a different level of performance measurement. Moreover, the plurality of visual representations may correspond to a subset of the plurality of performance measurements during periods of time when the client device was on a particular type of call. In addition, the plurality of performance measurements can indicate a level of connectivity between the client device and one or more access points with which the client device was associated during the period of time. In some embodiments, the plurality of performance measurements can indicate a call quality measurement for an active call for the client device. In some embodiments, a color used within each visual representation indicates the respective performance measurement for the client device.

The present disclosure also may be embodied in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions executable by a processing resource to:
   determine, based on a level of at least one performance measurement of a client device, a visual characteristic of a line on a map of a physical environment between a first physical location and a second physical location, wherein the client device moves from the first physical location to the second physical location; and
   generate a visual representation for the client device over a period of time, the visual representation representing, at each point in time during the period of time, (i) a respective level of at least one performance measurement of the client device and (ii) a respective physical location of the client device along the line that is formatted with the determined visual characteristic.

2. The non-transitory computer readable medium of claim 1, wherein at least one performance measurement comprises a health of the client device, a transmission power, a received signal strength indicator (RSSI), a network usage, a noise floor, or a combination thereof.

3. The non-transitory computer readable medium of claim 1, wherein the instructions further comprise instructions to obtain a plurality of performance measurements and physical locations of the client device over the period of time, wherein the client device is associated with an access point in a network covering the physical environment.

4. The non-transitory computer readable medium of claim 1, wherein the instructions further comprise instructions to obtain a plurality of performance measurements of the client device when the client device is on an active call.

5. The non-transitory computer readable medium of claim 4, wherein at least one performance measurement comprises a call quality measurement for the active call.

6. The non-transitory computer readable medium of claim 1, wherein the instructions further comprise instructions to display the map of the physical environment with the visual representation.

7. The non-transitory medium of claim 1, wherein the visual representation corresponds to a subset of the at least one performance measurement during the period of time when the client device was on a particular type of active call.

8. The non-transitory medium of claim 7, wherein the particular type of active call further comprises a voice call, a video call, or a voice and video call.

9. The non-transitory medium of claim 7, wherein the visual representation further comprises at least one of a respective start time or a respective end time of the time period when the client device was on the particular type of active call.

10. The non-transitory medium of claim 1, wherein the visual characteristic of the line comprises a thickness of the line, wherein a degree of the thickness indicates the level of the performance measurement.

11. The non-transitory medium of claim 1, wherein the visual characteristic of the line comprises a shade of the line, wherein a degree of the shade indicates the level of the performance measurement.

12. The non-transitory medium of claim 1, wherein the visual characteristic of the line comprises a color of the line, wherein a particular color of a set of available colors of the line indicates the level of the performance measurement.

13. A network device; and
   non-transitory computer readable medium comprising instructions executable by a processing resource to:
   obtain at least one performance measurement of a client device on an active call and physical location information of the client device, wherein the client device moves from a first physical location to a second physical location in a physical environment;
   determine, based on a level of at least one performance measurement of the client device, a visual characteristic of a line on a map of the physical environment between the first physical location and the second physical location; and
   cause generation of a visual representation for the client device over a period of time, the visual representation representing, at each point in time during the period of time, (i) a respective level of at least one performance measurement of the client device and (ii) a respective physical location of the client device along the line on the map that is formatted with the determined visual characteristic.

14. The network device of claim 13, wherein the network device further comprises an access point.

15. The network device of claim 13, wherein the network device further comprises a data transfer device, wherein the data transfer device further comprises a network switch, a router, a controller or a combination thereof.

16. The network device of claim 13, wherein the obtaining further comprises obtaining via a receiving mechanism that is coupled to a radio to obtain at least one performance measurement of the client device, wherein the radio is included in the network device.

17. The network device of claim 13, wherein the obtaining further comprises obtaining via a receiving mechanism that is coupled to a network interface to obtain at least one performance measurement of the client device, wherein the network interface is included in the network device.

18. A method, comprising:
  determining, based on a level of at least one performance measurement of a client device, a visual characteristic of a line on a map of a physical environment between a first physical location and a second physical location, wherein the client device moves from the first physical location to the second physical location; and
  generating a visual representation for the client device over a period of time, the visual representation representing, at a point in time during the period of time, (i) a respective level of at least one performance measurement of the client device and (ii) a respective physical location of the client device along the line that is formatted with the determined visual characteristic.

19. The method of claim 18, wherein generating the visual representation further comprises generating a video showing a time sequence of the client device moving through the physical environment.

20. The method of claim 19, wherein generating the video further comprises showing the time sequence of the client device concurrently with a respective level of at least one performance measurement of the client device at each respective point in time during the period of time.

* * * * *